United States Patent
Lu

(10) Patent No.: US 8,121,758 B2
(45) Date of Patent: Feb. 21, 2012

(54) SYSTEM FOR DETERMINING TORQUE AND TIRE FORCES USING INTEGRATED SENSING SYSTEM

(75) Inventor: Jianbo Lu, Livonia, MI (US)

(73) Assignee: Ford Global Technologies, Dearborn, MI (US)

( * ) Notice: Subject to any disclaimer, the term of this patent is extended or adjusted under 35 U.S.C. 154(b) by 1476 days.

(21) Appl. No.: 11/270,350

(22) Filed: Nov. 9, 2005

(65) Prior Publication Data

US 2007/0106443 A1    May 10, 2007

(51) Int. Cl.
*B60G 17/018* (2006.01)

(52) U.S. Cl. ...... 701/38; 701/37; 280/5.506; 280/5.508; 280/5.51; 303/148; 303/149

(58) Field of Classification Search ............ 701/70, 701/37, 38; 180/197, 199; 303/122.01, 148, 303/149, 150; 280/5.506, 5.508, 5.51
See application file for complete search history.

(56) References Cited

U.S. PATENT DOCUMENTS

| | | |
|---|---|---|
| 2,917,126 A | 12/1959 | Phillips |
| 3,604,273 A | 9/1971 | Kwok et al. |
| 3,608,925 A | 9/1971 | Murphy |
| 3,797,893 A | 3/1974 | Burckhardt |
| 3,899,028 A | 8/1975 | Morris et al. |
| 3,948,567 A | 4/1976 | Kasselmann et al. |
| 3,972,543 A | 8/1976 | Presley et al. |
| 4,023,864 A | 5/1977 | Lang et al. |
| RE30,550 E | 3/1981 | Reise |
| 4,294,113 A | 10/1981 | Sprott et al. |
| 4,480,714 A | 11/1984 | Yabuta et al. |
| 4,548,079 A | 10/1985 | Klatt |
| 4,592,565 A | 6/1986 | Eagle |
| 4,597,462 A | 7/1986 | Sano et al. |
| 4,624,476 A | 11/1986 | Tanaka et al. |
| 4,650,212 A | 3/1987 | Yoshimura |
| 4,679,808 A | 7/1987 | Ito et al. |
| 4,690,553 A | 9/1987 | Fukamizu et al. |
| 4,696,489 A | 9/1987 | Fujishiro et al. |
| 4,705,130 A | 11/1987 | Fukunaga et al. |
| 4,712,807 A | 12/1987 | Kurosawa |
| 4,761,022 A | 8/1988 | Ohashi et al. |
| 4,765,649 A | 8/1988 | Ikemoto et al. |

(Continued)

FOREIGN PATENT DOCUMENTS

DE    36 16 907    11/1987

(Continued)

OTHER PUBLICATIONS

"Axle Torque." Mar. 7, 2003. http://www.webtec.co.uk/techinfo/equation/eqnfr/eqn02.htm. Accessed from the Internet Archive at http://www.archive.org.*

(Continued)

*Primary Examiner* — Thomas Black
*Assistant Examiner* — Peter D Nolan
(74) *Attorney, Agent, or Firm* — Angela M. Brunetti; Fredrick Owens

(57) ABSTRACT

A vehicle (10) includes a control system (18) that is used to control a vehicle system. The control system determines an axle torque, and longitudinal forces at each tire in response to the axle torque. Lateral forces at each tire are determined in response to the longitudinal forces. The control system of the vehicle is determined in response to the longitudinal and lateral forces.

16 Claims, 3 Drawing Sheets

U.S. PATENT DOCUMENTS

| | | |
|---|---|---|
| 4,767,588 A | 8/1988 | Ito |
| 4,778,773 A | 10/1988 | Sukegawa |
| 4,797,823 A | 1/1989 | Ikemoto et al. |
| 4,809,183 A | 2/1989 | Eckert |
| 4,827,416 A | 5/1989 | Kawagoe et al. |
| 4,846,496 A | 7/1989 | Tanaka et al. |
| 4,872,116 A | 10/1989 | Ito et al. |
| 4,888,696 A | 12/1989 | Akatsu et al. |
| 4,898,431 A | 2/1990 | Karnopp et al. |
| 4,908,767 A * | 3/1990 | Scholl et al. .................. 701/220 |
| 4,930,082 A | 5/1990 | Harara et al. |
| 4,951,198 A | 8/1990 | Watanabe et al. |
| 4,960,292 A | 10/1990 | Sadler |
| 4,964,679 A | 10/1990 | Rath |
| 4,967,865 A | 11/1990 | Schindler |
| 4,976,330 A | 12/1990 | Matsumoto |
| 4,998,593 A | 3/1991 | Karnopp et al. |
| 5,002,141 A | 3/1991 | Loshbough et al. |
| 5,002,142 A | 3/1991 | Klosterhaus |
| 5,010,974 A * | 4/1991 | Matsuda ....................... 180/233 |
| 5,033,770 A | 7/1991 | Kamimura et al. |
| 5,058,017 A | 10/1991 | Adachi et al. |
| 5,066,041 A | 11/1991 | Kindermann et al. |
| 5,085,458 A | 2/1992 | Kii et al. |
| 5,088,040 A | 2/1992 | Matsuda et al. |
| 5,089,967 A | 2/1992 | Haseda et al. |
| 5,097,917 A | 3/1992 | Serizawa et al. |
| 5,159,553 A | 10/1992 | Karnopp et al. |
| 5,163,319 A | 11/1992 | Spies et al. |
| 5,189,920 A | 3/1993 | Martinez |
| 5,200,896 A | 4/1993 | Sato et al. |
| 5,208,749 A | 5/1993 | Adachi et al. |
| 5,217,248 A | 6/1993 | Reast |
| 5,224,765 A | 7/1993 | Matsuda |
| 5,228,757 A | 7/1993 | Ito et al. |
| 5,230,396 A | 7/1993 | Yasui |
| 5,239,868 A | 8/1993 | Takenaka et al. |
| 5,247,466 A | 9/1993 | Shimada et al. |
| 5,261,503 A | 11/1993 | Yasui |
| 5,265,020 A | 11/1993 | Nakayama |
| 5,265,481 A | 11/1993 | Sonderegger et al. |
| 5,274,576 A | 12/1993 | Williams |
| 5,278,761 A | 1/1994 | Ander et al. |
| 5,282,134 A | 1/1994 | Gioutsos et al. |
| 5,297,646 A | 3/1994 | Yamamura et al. |
| 5,307,274 A | 4/1994 | Takata et al. |
| 5,311,431 A | 5/1994 | Cao et al. |
| 5,311,956 A | 5/1994 | Sugiyama |
| 5,324,102 A | 6/1994 | Roll et al. |
| 5,335,176 A | 8/1994 | Nakamura |
| 5,365,439 A | 11/1994 | Momose et al. |
| 5,370,199 A | 12/1994 | Akuta et al. |
| 5,408,411 A | 4/1995 | Nakamura et al. |
| 5,438,515 A | 8/1995 | Miichi et al. |
| 5,446,658 A | 8/1995 | Pastor et al. |
| 5,455,770 A | 10/1995 | Hadeler et al. |
| 5,490,063 A | 2/1996 | Genise |
| 5,510,989 A | 4/1996 | Zabler et al. |
| 5,515,277 A | 5/1996 | Mine |
| 5,548,536 A | 8/1996 | Ammon |
| 5,549,328 A | 8/1996 | Cubalchini |
| 5,560,688 A | 10/1996 | Schappler et al. |
| 5,576,957 A | 11/1996 | Asanuma et al. |
| 5,579,245 A | 11/1996 | Kato |
| 5,598,335 A | 1/1997 | You |
| 5,602,734 A | 2/1997 | Kithil |
| 5,610,575 A | 3/1997 | Gioutsos |
| 5,627,756 A | 5/1997 | Fukada et al. |
| 5,634,698 A | 6/1997 | Cao et al. |
| 5,640,324 A | 6/1997 | Inagaki |
| 5,648,903 A | 7/1997 | Liubakka |
| 5,671,982 A | 9/1997 | Wanke |
| 5,676,433 A | 10/1997 | Inagaki et al. |
| 5,684,702 A | 11/1997 | Phillips et al. |
| 5,694,319 A | 12/1997 | Suissa et al. |
| 5,703,776 A | 12/1997 | Soung |
| 5,707,117 A | 1/1998 | Hu et al. |
| 5,707,120 A | 1/1998 | Monzaki et al. |
| 5,719,790 A | 2/1998 | Lohrenz et al. |
| 5,720,533 A | 2/1998 | Pastor et al. |
| 5,722,743 A | 3/1998 | Sano |
| 5,723,782 A | 3/1998 | Bolles, Jr. |
| 5,732,377 A | 3/1998 | Eckert |
| 5,732,378 A | 3/1998 | Eckert et al. |
| 5,732,379 A | 3/1998 | Eckert et al. |
| 5,736,939 A | 4/1998 | Corcoran |
| 5,737,224 A | 4/1998 | Jeenicke et al. |
| 5,740,041 A | 4/1998 | Iyoda |
| 5,740,877 A | 4/1998 | Sasaki |
| 5,742,918 A | 4/1998 | Ashrafi et al. |
| 5,742,919 A | 4/1998 | Ashrafi et al. |
| 5,762,406 A | 6/1998 | Yasui et al. |
| 5,774,819 A | 6/1998 | Yamamoto |
| 5,782,543 A | 7/1998 | Monzaki et al. |
| 5,787,375 A | 7/1998 | Madau et al. |
| 5,797,663 A | 8/1998 | Kawaguchi et al. |
| 5,801,647 A | 9/1998 | Survo et al. |
| 5,809,434 A | 9/1998 | Ashrafi et al. |
| 5,816,670 A | 10/1998 | Yamada et al. |
| 5,825,284 A | 10/1998 | Dunwoody et al. |
| 5,842,143 A | 11/1998 | Lohrenz et al. |
| 5,857,160 A | 1/1999 | Dickinson et al. |
| 5,857,535 A | 1/1999 | Brooks |
| 5,869,943 A | 2/1999 | Nakashima et al. |
| 5,878,357 A | 3/1999 | Sivashankar et al. |
| 5,890,084 A | 3/1999 | Halasz et al. |
| 5,893,896 A | 4/1999 | Imamura et al. |
| 5,925,083 A | 7/1999 | Ackermann |
| 5,926,087 A | 7/1999 | Busch |
| 5,931,546 A | 8/1999 | Nakashima et al. |
| 5,931,887 A | 8/1999 | Hac |
| 5,935,181 A | 8/1999 | Iwasaki |
| 5,941,920 A | 8/1999 | Schubert |
| 5,944,137 A | 8/1999 | Moser et al. |
| 5,944,392 A | 8/1999 | Tachihata et al. |
| 5,946,644 A | 8/1999 | Cowan et al. |
| 5,948,028 A | 9/1999 | Raad et al. |
| 5,964,819 A | 10/1999 | Naito |
| 5,965,808 A | 10/1999 | Normann |
| 5,971,503 A | 10/1999 | Joyce et al. |
| 6,002,974 A * | 12/1999 | Schiffmann ..................... 701/36 |
| 6,002,975 A | 12/1999 | Schiffmann et al. |
| 6,026,926 A | 2/2000 | Noro et al. |
| 6,038,495 A | 3/2000 | Schiffmann |
| 6,040,916 A | 3/2000 | Griesinger |
| 6,050,360 A | 4/2000 | Pattok et al. |
| 6,055,472 A | 4/2000 | Breunig et al. |
| 6,062,336 A | 5/2000 | Amberkar et al. |
| 6,065,558 A | 5/2000 | Wielenga |
| 6,073,065 A | 6/2000 | Brown et al. |
| 6,079,513 A | 6/2000 | Nishizaki et al. |
| 6,081,761 A | 6/2000 | Harada et al. |
| 6,085,133 A | 7/2000 | Keuper et al. |
| 6,085,860 A | 7/2000 | Hackl et al. |
| 6,086,168 A | 7/2000 | Rump |
| 6,089,344 A | 7/2000 | Baughn et al. |
| 6,104,284 A | 8/2000 | Otsuka |
| 6,121,873 A | 9/2000 | Yamada et al. |
| 6,122,568 A | 9/2000 | Madau et al. |
| 6,122,584 A | 9/2000 | Lin et al. |
| 6,129,172 A | 10/2000 | Yoshida et al. |
| 6,141,604 A | 10/2000 | Mattes et al. |
| 6,141,605 A | 10/2000 | Joyce |
| 6,144,904 A | 11/2000 | Tseng |
| 6,149,251 A | 11/2000 | Wuerth et al. |
| 6,161,905 A | 12/2000 | Hac et al. |
| 6,167,357 A | 12/2000 | Zhu |
| 6,169,939 B1 | 1/2001 | Raad et al. |
| 6,169,946 B1 | 1/2001 | Griessbach |
| 6,170,594 B1 | 1/2001 | Gilbert |
| 6,176,555 B1 | 1/2001 | Semsey |
| 6,178,365 B1 | 1/2001 | Kawagoe et al. |
| 6,178,375 B1 | 1/2001 | Breunig |
| 6,179,310 B1 | 1/2001 | Clare et al. |
| 6,179,394 B1 | 1/2001 | Browalski et al. |
| 6,184,637 B1 | 2/2001 | Yamawaki et al. |
| 6,185,485 B1 | 2/2001 | Ashrafi et al. |

| | | |
|---|---|---|
| 6,185,497 B1 | 2/2001 | Taniguchi et al. |
| 6,186,267 B1 | 2/2001 | Hackl et al. |
| 6,192,305 B1 | 2/2001 | Schiffmann |
| 6,195,606 B1 | 2/2001 | Barta et al. |
| 6,198,988 B1 | 3/2001 | Tseng |
| 6,202,009 B1 | 3/2001 | Tseng |
| 6,202,020 B1 | 3/2001 | Kyrtsos |
| 6,206,383 B1 | 3/2001 | Burdock |
| 6,219,604 B1 | 4/2001 | Dilger et al. |
| 6,223,114 B1 | 4/2001 | Boros et al. |
| 6,226,579 B1 | 5/2001 | Hackl et al. |
| 6,227,482 B1 | 5/2001 | Yamamoto |
| 6,232,875 B1 | 5/2001 | DeZorzi |
| 6,233,510 B1 | 5/2001 | Platner et al. |
| 6,236,916 B1 | 5/2001 | Staub et al. |
| 6,263,261 B1 | 7/2001 | Brown et al. |
| 6,266,596 B1 | 7/2001 | Hartman et al. |
| 6,272,420 B1 | 8/2001 | Schramm et al. |
| 6,278,930 B1 | 8/2001 | Yamada et al. |
| 6,282,471 B1 | 8/2001 | Burdock et al. |
| 6,282,472 B1 | 8/2001 | Jones et al. |
| 6,282,474 B1 | 8/2001 | Chou et al. |
| 6,290,019 B1 | 9/2001 | Kolassa et al. |
| 6,292,734 B1 | 9/2001 | Murakami et al. |
| 6,292,759 B1 | 9/2001 | Schiffmann |
| 6,311,111 B1 | 10/2001 | Leimbach et al. |
| 6,314,329 B1 | 11/2001 | Madau et al. |
| 6,315,373 B1 | 11/2001 | Yamada et al. |
| 6,321,141 B1 | 11/2001 | Leimbach |
| 6,324,445 B2 | 11/2001 | Tozu et al. |
| 6,324,446 B1 | 11/2001 | Brown et al. |
| 6,324,458 B1 | 11/2001 | Takagi et al. |
| 6,330,522 B1 | 12/2001 | Takeuchi |
| 6,332,104 B1 | 12/2001 | Brown et al. |
| 6,338,012 B2 | 1/2002 | Brown et al. |
| 6,349,247 B1 | 2/2002 | Schramm et al. |
| 6,351,694 B1 | 2/2002 | Tseng et al. |
| 6,352,318 B1 | 3/2002 | Hosomi et al. |
| 6,356,188 B1 | 3/2002 | Meyers et al. |
| 6,360,147 B1 | 3/2002 | Lee |
| 6,363,309 B1 | 3/2002 | Irie et al. |
| 6,366,844 B1 | 4/2002 | Woywod et al. |
| 6,370,938 B1 | 4/2002 | Leimbach et al. |
| 6,394,240 B1 | 5/2002 | Barwick |
| 6,397,127 B1 | 5/2002 | Meyers et al. |
| 6,409,286 B1 | 6/2002 | Fennel |
| 6,419,240 B1 | 7/2002 | Burdock et al. |
| 6,424,897 B1 | 7/2002 | Mattes et al. |
| 6,427,102 B1 | 7/2002 | Ding |
| 6,428,118 B1 | 8/2002 | Blosch |
| 6,433,681 B1 | 8/2002 | Foo et al. |
| 6,438,463 B1 | 8/2002 | Tobaru et al. |
| 6,438,464 B1 | 8/2002 | Woywod et al. |
| 6,456,194 B1 | 9/2002 | Carlson et al. |
| 6,459,990 B1 | 10/2002 | McCall et al. |
| 6,471,218 B1 | 10/2002 | Burdock et al. |
| 6,477,480 B1 | 11/2002 | Tseng et al. |
| 6,491,353 B2 | 12/2002 | Hackl |
| 6,496,758 B2 | 12/2002 | Rhode et al. |
| 6,496,763 B2 | 12/2002 | Griessbach |
| 6,498,976 B1 | 12/2002 | Ehlbeck et al. |
| 6,502,023 B1 | 12/2002 | Fukada |
| 6,523,637 B1 | 2/2003 | Nakano et al. |
| 6,526,342 B1 | 2/2003 | Burdock et al. |
| 6,529,803 B2 | 3/2003 | Meyers et al. |
| 6,529,811 B2 | 3/2003 | Watson et al. |
| 6,542,073 B2 | 4/2003 | Yeh et al. |
| 6,542,792 B2 | 4/2003 | Schubert et al. |
| 6,547,022 B2 | 4/2003 | Hosomi et al. |
| 6,547,343 B1 | 4/2003 | Hac |
| 6,549,842 B1 * | 4/2003 | Hac et al. ................ 701/80 |
| 6,553,284 B2 | 4/2003 | Holst et al. |
| 6,554,293 B1 | 4/2003 | Fennel et al. |
| 6,556,908 B1 | 4/2003 | Lu et al. |
| 6,559,634 B2 | 5/2003 | Yamada |
| 6,593,849 B2 | 7/2003 | Chubb et al. |
| 6,598,946 B2 | 7/2003 | Nagae |
| 6,600,414 B2 | 7/2003 | Foo et al. |
| 6,600,985 B2 | 7/2003 | Weaver et al. |
| 6,618,656 B2 | 9/2003 | Kueblbeck et al. |
| 6,631,317 B2 | 10/2003 | Lu et al. |
| 6,637,543 B2 | 10/2003 | Card |
| 6,644,454 B2 | 11/2003 | Yamada et al. |
| 6,650,971 B2 | 11/2003 | Haas |
| 6,654,674 B2 | 11/2003 | Lu et al. |
| 6,657,539 B2 | 12/2003 | Yamamoto et al. |
| 6,662,097 B2 * | 12/2003 | Kin et al. ................ 701/80 |
| 6,678,631 B2 | 1/2004 | Schiffmann |
| 6,681,196 B2 | 1/2004 | Glaser et al. |
| 6,681,881 B2 | 1/2004 | Andonian et al. |
| 6,698,542 B2 | 3/2004 | Nishizaki et al. |
| 6,704,631 B2 | 3/2004 | Winner et al. |
| 6,718,248 B2 | 4/2004 | Lu |
| 6,719,087 B2 | 4/2004 | Demerly |
| 6,725,140 B2 | 4/2004 | Lu et al. |
| 6,741,922 B2 | 5/2004 | Holler |
| 6,745,624 B2 | 6/2004 | Porter |
| 6,747,553 B2 | 6/2004 | Yamada et al. |
| 6,756,890 B1 | 6/2004 | Schramm et al. |
| 6,766,875 B2 | 7/2004 | Yamamoto |
| 6,782,315 B2 * | 8/2004 | Lu et al. ................ 701/45 |
| 6,784,794 B1 | 8/2004 | McQuade |
| 6,799,092 B2 | 9/2004 | Lu |
| 6,816,764 B2 | 11/2004 | Coelingh et al. |
| 6,817,236 B1 * | 11/2004 | Griesser et al. ........... 73/146.2 |
| 6,834,218 B2 | 12/2004 | Meyers et al. |
| 6,856,868 B1 | 2/2005 | Le et al. |
| 6,873,897 B2 | 3/2005 | Faye et al. |
| 6,904,351 B1 * | 6/2005 | Hac ................ 701/70 |
| 2002/0013651 A1 * | 1/2002 | Weiberle et al. ............ 701/71 |
| 2002/0109310 A1 | 8/2002 | Lim |
| 2002/0111752 A1 * | 8/2002 | Nakamura ............ 702/42 |
| 2003/0055549 A1 | 3/2003 | Barta et al. |
| 2003/0100979 A1 * | 5/2003 | Lu et al. ................ 701/36 |
| 2003/0109939 A1 | 6/2003 | Burgdorf et al. |
| 2003/0171865 A1 | 9/2003 | Moser |
| 2003/0182025 A1 | 9/2003 | Tseng et al. |
| 2004/0010383 A1 | 1/2004 | Lu |
| 2004/0019418 A1 | 1/2004 | Lu |
| 2004/0026158 A1 | 2/2004 | Rieth et al. |
| 2004/0064246 A1 | 4/2004 | Lu et al. |
| 2004/0119335 A1 | 6/2004 | Szabo et al. |
| 2004/0158368 A1 | 8/2004 | Haas |
| 2004/0167694 A1 * | 8/2004 | Tamai ................ 701/41 |
| 2004/0167701 A1 * | 8/2004 | Mattson et al. ........... 701/71 |
| 2004/0217647 A1 | 11/2004 | Einig |

FOREIGN PATENT DOCUMENTS

| | | |
|---|---|---|
| DE | 38 15 938 | 11/1989 |
| DE | 43 21 571 | 1/1994 |
| DE | 42 27 886 | 2/1994 |
| DE | 42 28 893 | 3/1994 |
| DE | 43 35 979 | 4/1995 |
| DE | 43 42 732 | 6/1995 |
| DE | 199 07 633 | 10/1999 |
| EP | 0 430 813 | 12/1993 |
| EP | 0 662 601 | 7/1995 |
| EP | 0 758 601 | 2/1997 |
| EP | 1 046 571 | 4/2000 |
| EP | 1 197 409 | 9/2001 |
| FR | 24 25 342 | 12/1979 |
| GB | 2257403 | 1/1993 |
| GB | 2 342 078 | 4/2000 |
| JP | 62055211 | 9/1985 |
| JP | 63116918 | 5/1988 |
| JP | 63151539 | 6/1988 |
| JP | 63203456 | 8/1988 |
| JP | 1101238 | 4/1989 |
| JP | 2171373 | 7/1990 |
| JP | 3042360 | 2/1991 |
| JP | 3045452 | 2/1991 |
| JP | 4008837 | 1/1992 |
| JP | 5016699 | 1/1993 |
| JP | 5254406 | 10/1993 |
| JP | 6278586 | 10/1994 |
| JP | 6297985 | 10/1994 |
| JP | 6312612 | 11/1994 |
| JP | 8080825 | 3/1996 |

| | | |
|---|---|---|
| JP | 9005352 | 1/1997 |
| JP | 10024819 | 1/1998 |
| JP | 10329682 | 12/1998 |
| JP | 11011272 | 1/1999 |
| JP | 11170992 | 6/1999 |
| JP | 11254992 | 9/1999 |
| JP | 11255093 | 9/1999 |
| JP | 11304663 | 10/1999 |
| JP | 11304662 | 11/1999 |
| JP | 11321603 | 11/1999 |
| SU | 816849 | 3/1981 |
| WO | WO 02/20318 | 3/2002 |

OTHER PUBLICATIONS

U.S. Appl. No. 10/459,697, filed Jun. 11, 2003, Lu.

U.S. Appl. No. 10/849,590, filed May 20, 2004, Brown.

A method for reducing on-road rollovers—anti-rollover braking, Thomas J. Wielenga, Dynamotive, LLC, International Congress and Exposition, Detroit, Michigan, Mar. 1-4, 1999.

Eger, R., Majjad, R., Naser, N., "Rollover simulation based on a nonlinear model", SAE 98020.

Nalecz, A.G., Bindemann, A.C., Brewer H.K., "Dynamic analysis of vehicle rollover", 12$^{th}$ International Conference on Experimental Safety Vehicles, Goteborg, Sweden, May 29-Jun. 1, 1989.

Niii, N., Nishijima, Y., Nakagaw, K., "rollover analysis method of a large-size bus", JSAE 9540020, 1995.

Eger, R., Kiencke, U., "Modeling of rollover sequences", Control Engineering Practice 11 (2003) 209-216.

Chen, Bo-Chivan, Peng, Huei; "A Real-time Rollover Threat Index for Sports Utility Vehicles", Proceedings of the American Control Conference, San Diego, CA, Jun. 1999.

\* cited by examiner

SYSTEM FOR DETERMINING TORQUE AND TIRE FORCES USING INTEGRATED SENSING SYSTEM

TECHNICAL FIELD

The present invention relates generally to a control apparatus for controlling a system of an automotive vehicle in response to sensed dynamic behavior, and more specifically, to a method and apparatus for determining tire torque and the tire forces between the tires and the road surface and controlling a vehicle system based on the tire torque and tire forces.

BACKGROUND

Various automotive vehicles have recently begun including vehicle dynamic control systems. Such vehicle dynamic control systems include yaw stability control systems, roll stability control systems, integrated vehicle dynamic control systems, etc. The ongoing goal of vehicle controls is to achieve a coordinated system level vehicle performances for ride, handling, safety and fuel economy.

With current advances in mechatronics, vehicle controls have increased opportunities for achieving performances, which were previously reserved for spacecraft and aircraft. For example, gyro sensors, previously only used in aircraft, have now been incorporated in various vehicle controls, and the anti-lock brake systems invented for airplanes are now standard automotive control systems. Current sensor technology generates ever-increasing opportunities for vehicle control. A typical vehicle control system senses 3-dimensional dynamic vehicle motions. For example, during yaw stability and roll stability controls, the control task involves three-dimensional motions along the vehicle roll, pitch, and yaw directions and along the vehicle longitudinal, lateral and vertical directions.

The coupling between different motion directions may not be as strong as in an aircraft or a spacecraft, however, they cannot be neglected in most maneuvers that involve vehicle rolling over or yawing. For example, the excessive steering of a vehicle will lead to excessive yaw and lateral motion, which further cause large rolling motion towards the outside of the turning. If the driver brakes the vehicle during the excessive steering, then the vehicle will also experience roll and pitch motions together with lateral and longitudinal accelerations. Hence, a successful vehicle dynamics control involves an accurate determination of the vehicle roll, pitch and relative yaw attitude (same as the so-called sideslip angle).

With the aforementioned vehicle attitude determination needs, a new vehicle sensing technology which contains an inertial measurement unit (IMU) and all the other sensors used in vehicle controls is desirable. This sensing system is called an Integrated Sensing System (short to ISS). IMUs have been used in inertial navigation system (INS) for aircraft and satellite for decades. Typically an INS system determines the attitude of a flight vehicle through the sensor signals from the IMU sensors. The IMU sensor set includes three gyros and three linear accelerometers. The INS contains an IMU and a processor unit to compute the navigation solutions necessary for navigation, attitude reference and various other data communication sources. At the same token, the ISS will also be used (but not limited) to vehicle attitude determination.

With the use of IMU sensor cluster and the other standard sensors equipped with a vehicle, accurate estimation of the vehicle operating states is possible. One of the important states are the forces and torques applied to the wheels, including tire longitudinal and lateral forces, the driving torques and braking torques applied to the wheels. Those torques and forces may be used to determine the intention of the driver, the road surface condition and to facilitate the vehicle dynamics controls like yaw stability control and roll stability control. A four-wheel model is used in the computation rather than a bicycle model in prior known systems. This results in a more accurate determination of the forces and torques. Existing computations of the tire lateral forces using a bicycle model are conducted along the vehicle body frame; hence normal loading will contaminate the computation. The bicycle model also cannot differentiate vehicle yaw motion due to longitudinal force deviation between the left and right sides and is inaccurate during brake intervention.

It would therefore be desirable to accurately estimate the tire lateral and longitudinal forces applied to the wheels, and the braking and driving torques applied to each wheel.

SUMMARY

The present invention provides a method and system to dynamically predict the tire torque and the forces between the tire and road surface by using the available sensors typically equipped in an integrated vehicle dynamics control system. The computation unit for this will be described below as the Force and Torque Estimation (FATE) unit. The output of the FATE unit may be used in dynamic control systems. For example, the rollover event happens when one side of the wheels experience extremely high lateral tire forces. The accurate determination of the lateral tire forces in the FATE unit can be used to assess the potential for a rollover, which will help cut unnecessary activations that could occur if only the lateral acceleration is used.

In one aspect of the invention, a method of controlling a vehicle having tires includes determining an axle torque, determining longitudinal forces at each tire in response to the axle torque, determining lateral forces at each tire in response to the longitudinal forces, and controlling a vehicle system in response to the longitudinal forces and the lateral forces.

In a further aspect of the invention, a method of controlling a vehicle includes determining a road frame longitudinal acceleration, determining a road frame lateral acceleration of the vehicle, determining a road frame yaw rate, determining an axle torque, determining a steered wheel angle, and determining tire longitudinal accelerations in response to the axle torque. The method further includes determining lateral and longitudinal tire forces in response to the road frame longitudinal accelerations, road frame lateral acceleration, the wheel speed derivatives, the drive torque from powertrain and the steered wheel angle. A vehicle system is controlled in response to the computed tire longitudinal and lateral forces.

One advantage of the invention is that no additional sensors in addition to the dynamic control system sensors are required for the system. Therefore, the tire torque and tire forces may be determined in a cost effective manner.

Other advantages and features of the present invention will become apparent when viewed in light of the detailed description of the preferred embodiment when taken in conjunction with the attached drawings and appended claims.

DESCRIPTION OF THE PREFERRED EMBODIMENT

Figure 1:
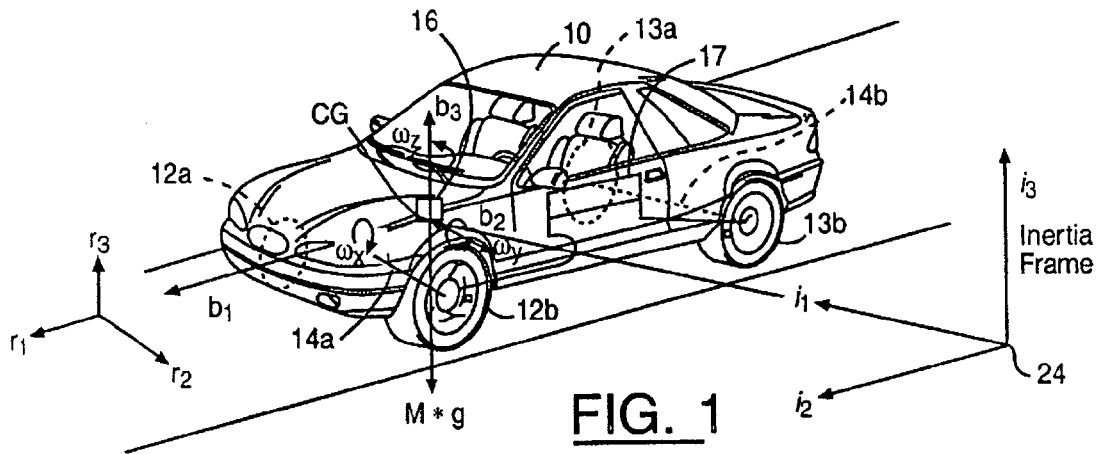
FIG. 1 is a diagrammatic view of a vehicle with variable vectors and coordinate frames according to the present invention.

In the following figures the same reference numerals will be used to identify the same components. The present invention is preferably used in conjunction with vehicle control systems, which include, but are not limited to a yaw stability control system, a roll stability control system, an integrated vehicle dynamics control system, or a total vehicle control system for achieving fuel economy and safety and other vehicle system level performances. The system is also described with respect to an inertial measurement unit (IMU) or integrated sensing system (ISS). However, discrete sensors may also be used to implement the present invention.

Referring to FIG. 1, an automotive vehicle 10 with a safety system of the present invention is illustrated with the various forces and moments thereon during a rollover condition. Vehicle 10 has front right (FR) and front left (FL) wheel/tires 12a and 12b and rear right (RR) and rear left (RL) wheel/tires 13, respectively. The vehicle 10 may also have a number of different types of front steering systems 14a and rear steering systems 14b, including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. Generally, the vehicle has a weight represented as Mg at the center of gravity of the vehicle, where g=9.8 m/s$^2$ and M is the total mass of the vehicle.

As mentioned above, the system may also be used with safety systems including active/semi-active suspension systems, anti-roll bar, or airbags or other safety devices deployed or activated upon sensing predetermined dynamic conditions of the vehicle.

The sensing system 16 is coupled to a control system 18. The sensing system 16 may comprise many different sensors including the sensor set typically found in a roll stability control or a rollover control system (including lateral accelerometer, yaw rate sensor, steering angle sensor and wheel speed sensor which are equipped for a traditional yaw stability control system) together with a roll rate sensor, or in addition a pitch rate sensor and a vertical accelerometer. The various sensors will be further described below. The sensors may also be used by the control system in various determinations such as to determine a lifting event, determine normal forces on the wheels, determine a height and position of a mass, etc. The wheel speed sensors 20 are mounted at each corner of the vehicle and generate signals corresponding to the rotational speed of each wheel. The rest of the sensors of sensing system 16 may be mounted directly on the center of gravity of the vehicle body, along the directions x, y and z shown in FIG. 1. As those skilled in the art will recognize, the frame from $b_1$,$b_2$ and $b_3$ is called a body frame 22, whose origin is located at the center of gravity of the car body, with the $b_1$, corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate and $\omega_z$ for the yaw rate. Calculations may take place in an inertial frame 24 that may be derived from the body frame 22 as described below.

The roll, pitch and yaw angular rate sensors and the lateral, longitudinal, and vertical accelerometers may be mounted on the vehicle car body along the body frame directions $b_1$,$b_2$ and $b_3$ which are the x-y-z axes of the sprung mass of the vehicle. The sensors may be in an IMU or ISS or discrete sensors. The sensors may be off the center of gravity but numerically translated to the center of gravity.

The longitudinal acceleration sensor is mounted on the car body located at the center of gravity, with its sensing direction along $b_1$ axis, whose output is denoted as $a_x$. The lateral acceleration sensor is mounted on the car body located at the center of gravity, with its sensing direction along $b_2$ axis, whose output is denoted as $a_y$.

The other frame used in the following discussion includes the road frame, as depicted in FIG. 1. The road frame system $r_1r_2r_3$ is fixed on the driven road surface, where the $r_3$ axis is along the average road normal direction computed from the normal directions of the four-tire/road contact patches.

In the following discussion, the Euler angles of the body frame $b_1b_2b_3$ with respect to the road frame $r_1r_2r_3$ are denoted as $\theta_{xbr}$ and $\theta_{ybr}$, which are also called the relative Euler angles (i.e., relative roll and relative pitch angles, respectively).

Figure 2:
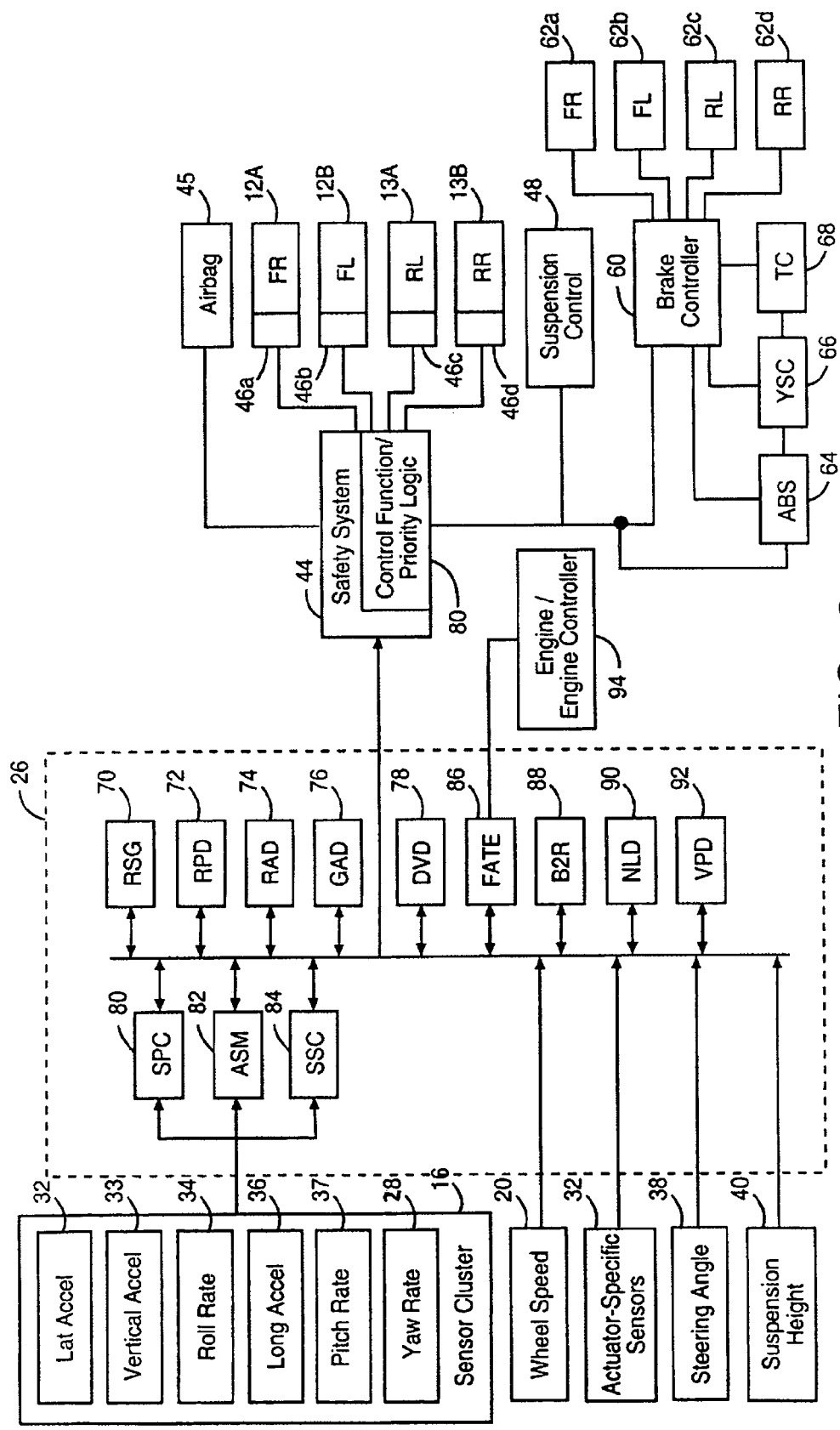
FIG. 2 is a block diagram of a stability system according to the present invention.

Referring now to FIG. 2, control system 18 is illustrated in further detail having a controller 26 used for receiving information from a number of sensors which may include a yaw rate sensor 28, a speed sensor 20, a lateral acceleration sensor 32, a vertical accelerometer sensor 33, a roll angular rate sensor 34, a longitudinal acceleration sensor 36, a pitch rate sensor 37, steering angle (of the wheels or actuator) position sensor 38, a suspension position (height) sensor 40. It should be noted that various combinations and sub-combinations of the sensors may be used.

The sensor cluster 16 may be within a housing 43, and includes a roll rate sensor 34 generating a roll rate signal, a pitch rate sensor 37, generating a pitch rate signal, a yaw rate sensor 38 generating a yaw rate signal, a longitudinal acceleration sensor 36 generating a longitudinal acceleration signal, a lateral acceleration sensor 32 generating a lateral acceleration signal, and a vertical acceleration sensor 33 generating a vertical acceleration sensor 56 generating a vertical acceleration signal.

If discrete or individual sensors are used lateral acceleration, roll orientation and speed may be obtained using a global positioning system (GPS). Based upon inputs from the sensors, controller 26 may control a safety device 44. Depending on the desired sensitivity of the system and various other factors, not all the sensors may be used in a commercial embodiment. Safety device 44 may control an airbag 45 or a steering actuator 46a-46d at one or more of the wheels 12a, 12b, 13a, 13b of the vehicle. Also, other vehicle components such as a suspension control 48 may be used to adjust the suspension to prevent rollover.

Roll angular rate sensor 34 and pitch rate sensor 37 may sense the roll condition or lifting of the vehicle based on sensing the height of one or more points on the vehicle relative to the road surface. Sensors that may be used to achieve this include but are not limited to a radar-based proximity sensor, a laser-based proximity sensor and a sonar-based proximity sensor. The roll rate sensor 34 may also use a combination of sensors such as proximity sensors to make a roll rate determination.

Roll rate sensor 34 and pitch rate sensor 37 may also sense the roll condition or lifting based on sensing the linear or rotational relative displacement or displacement velocity of one or more of the suspension chassis components. This may be in addition to or in combination with suspension position sensor 40. The suspension position sensor 40, roll rate sensor 34 and/or the pitch rate sensor 37 may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The yaw rate sensor 28, the roll rate sensor 34, the lateral acceleration sensor 32, and the longitudinal acceleration sensor 36 may be used together to determine that the wheel has lifted. Such sensors may be used to determine wheel lift or estimate normal loading associated with wheel lift.

The roll condition such as the relative roll angle of the vehicle may also be established by one or more of the following translational or rotational positions, velocities or accelerations of the vehicle including a roll gyro, the roll rate sensor 34, the yaw rate sensor 28, the lateral acceleration sensor 32, the vertical acceleration sensor 33, a vehicle longitudinal acceleration sensor 36, lateral or vertical speed sensor including a wheel-based speed sensor 20, a radar-based speed sensor, a sonar-based speed sensor, a laser-based speed sensor or an optical-based speed sensor.

Controller 26 may include sensing algorithms including but not limited to reference attitude and reference directional velocity determinations, global/relative attitude determination, directional velocity determination, sensor plausibility check, sensor signal conditioning, sensor error compensation, road profile, surface condition determination, and abnormal state monitoring.

The controller 26 includes various control units controlling the aforementioned sensing algorithms. These units may include: a reference signal unit 70 (reference signal generator (RSG)), which includes an attitude reference computation and a velocity reference computation, a road profile unit 72 (road profile determination unit (RPD)), an attitude unit or relative attitude determination unit 74 (RAD), a global attitude unit 76 (global attitude determination unit (GAD) and a directional unit 78 (directional velocity determination unit (DVD)), a sensor plausibility unit 80 (sensor plausibility check unit (SPC)), an abnormal state unit 82 (abnormal state monitoring unit (ASM)), a sensor signal compensating unit 84 (SSC), an estimation unit 86 (force and torque estimation unit (FATE)), a car body to fixed reference frame unit 88 (body to reference unit (B2R)), a normal loading unit 90 (normal loading determination unit (NLD)), and a vehicle parameter unit 92 (vehicle parameter determination unit (VPD)). Signals generated from any one of the aforementioned units are referred to prediction of vehicle operation states signals. The present invention lies primarily in the normal loading detection unit (NLD) 90.

Safety device 44 may control the position of the front right wheel actuator 46A, the front left wheel actuator 46B, the rear left wheel actuator 46C, and the right rear wheel actuator 46D. Although as described above, two or more of the actuators may be simultaneously controlled. For example, in a rack-and-pinion system, the two wheels coupled thereto are simultaneously controlled.

Safety device 44 may be coupled to a brake controller 60. Brake controller 60 controls the amount of brake torque at a front right brake 62a, front left brake 62b, rear left brake 62c and a rear right brake 62d. Other safety systems such as an antilock brake system 64, a yaw stability control system 66 and a traction control system 68 may also benefit from the knowledge of the roll gradient, roll rate parameter, roll acceleration coefficient, additional mass and position of the mass. This information may impact the control strategy such as modifying the brake force.

Speed sensor 20 may be one of a variety of speed sensors known to those skilled in the art. For example, a suitable speed sensor may include a sensor at every wheel that is averaged by controller 26. The controller may translate the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. Speed may also be obtained from a transmission sensor. For example, if speed is determined while speeding up or braking around a corner, the lowest or highest wheel speed may not be used because of its error. Also, a transmission sensor may be used to determine vehicle speed. The wheel speed sensors are mounted at wheel locations and are denoted as $w_1, w_2, w_3, w_4$ for left-front, right-front, left-rear and right-rear wheels, respectively.

The roll condition of a vehicle can be characterized by the relative roll angle between the vehicle body and the wheel axle and the wheel departure angle (between the wheel axle and the average road surface). Both the relative roll angle and the wheel departure angle may be calculated in relative roll angle estimation module (RAD 74) by using the roll rate and lateral acceleration sensor signals. If both the relative roll angle and the wheel departure angles are large enough, the vehicle may be in either single wheel lifting or double wheel lifting. On the other hand, if the magnitude of both angles is small enough, the wheels are likely all grounded. In case that both of them are not small and the double wheel lifting condition is detected or determined, the sum of those two angles will be used by the feedback control module to compute the desired actuation command for achieving rollover control performance.

The roll condition of a vehicle can be characterized by rolling radius-based wheel departure roll angle, which captures the angle between the wheel axle and the average road surface through the dynamic rolling radii of the left and right wheels when both of the wheels are grounded. Since the computation of the rolling radius is related to the wheel speed and the linear velocity of the wheel, such rolling-radius based wheel departure angle will assume abnormal values when there are large wheel slips. This happens when a wheel is lifted and there is torque applied to the wheel. Therefore, if this rolling radius-based wheel departure angle is increasing rapidly, the vehicle might have lifted wheels. Small magnitude of this angle indicates the wheels are all grounded.

The roll condition of the vehicle can be seen indirectly from the wheel longitudinal slip. If during a normal braking or driving torque the wheels at one side of the vehicle experience increased magnitude of slip, then the wheels of that side are losing longitudinal road torque. This implies that the wheels are either driven on a low mu surface or lifted up. The low mu surface condition and wheel-lifted-up condition can be further differentiated based on the chassis roll angle computation, i.e., in low mu surface, the chassis roll angle is usually very small. Hence, an accurate determination of chassis roll is desired.

The roll condition of the vehicle can be characterized by the normal loading sustained at each wheel. Theoretically, when a normal loading at a wheel decreases to zero, the wheel is no longer contacting the road surface. In this case a potential rollover is underway. Large magnitude of this loading indicates that the wheel is grounded. Normal loading is a function of the calculated chassis roll and pitch angles. Hence, an accurate determination of chassis roll and pitch angles is desired.

The roll condition can be identified by checking the actual road torques applied to the wheels and the road torques, which are needed to sustain the wheels when they are grounded. The actual road torques can be obtained through torque balancing for each wheel using wheel acceleration, driving torque and braking torque. If the wheel is contacting the road surface, the calculated actual road torques must match or be larger than the torques determined from the nonlinear torques calculated from the normal loading and the longitudinal slip at each wheel.

The roll condition of a vehicle can be characterized by the chassis roll angle itself, i.e., the relative roll angle $\theta_{xr}$ between the vehicle body and the wheel axle. If this chassis roll angle is increasing rapidly, the vehicle might be on the edge of wheel lifting or rollover. Small magnitude of this angle indicates the wheels are not lifted or are all grounded. Hence, an accurate determination of the chassis roll angle is beneficial for determining if the vehicle is in non-rollover events.

The roll condition of a vehicle can also be characterized by the roll angle between the wheel axle and the average road surface, this is called wheel departure angle. If the roll angle is increasing rapidly, the vehicle has lifted wheel or wheels and aggressive control action needs to be taken in order to prevent the vehicle from rolling over. Small magnitude of this angle indicates the wheels are not lifted.

The center of gravity C is also illustrated with nominal mass M. A roll axis is also illustrated at a distance D from the center of gravity. The symbol $a_y$ is the lateral acceleration.

The safety device may include control function/priority logic. As illustrated, the logic resides within safety device 44, but may be part of controller 26 and/or brake controller 60.

The FATE module 86 may be coupled to an engine and/or engine controller 94 to receive a signal corresponding to the engine torque generated by the engine. As will be described below, from this value, various other torques including the transmission axle and tire torque may be determined.

Figure 3:
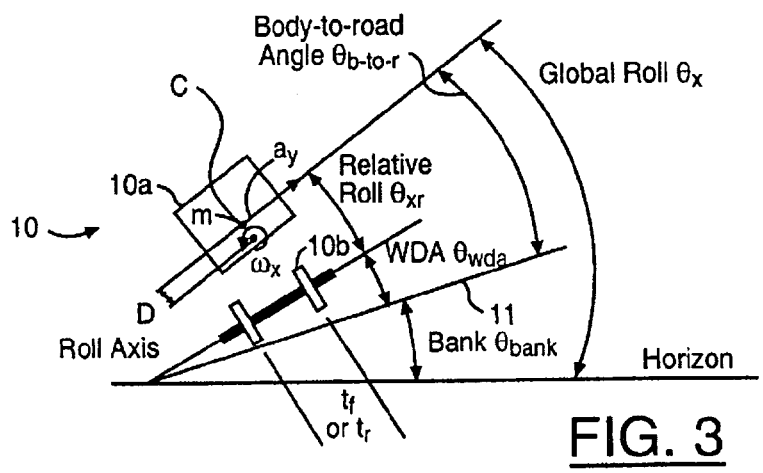
FIG. 3 is a front view of an automotive vehicle illustrating various angles according to the present invention.

Referring now to FIG. 3, the relationship of the various angles of the vehicle 10 relative to the road surface 11 is illustrated. In the following, a reference road bank angle $\theta_{bank}$ is shown relative to the vehicle 10 on a road surface. The vehicle has a vehicle body 10a and wheel axle 10b. The wheel departure angle $\theta_{wda}$ is the angle between the wheel axle and the road. The relative roll angle $\theta_{xr}$ is the angle between the wheel axle 10b and the body 10a. The global roll angle $\theta_x$ is the angle between the horizontal plane (e.g., at sea level) and the vehicle body 10a.

Another angle of importance is the linear bank angle. The linear bank angle is a bank angle that is calculated more frequently (perhaps in every loop) by subtracting the aforementioned relative roll angle from the calculated global roll angle. If all things were slowly changing without drift, errors or the like, the linear bank angle and reference road bank angle terms would be equivalent.

During an event causing the vehicle to roll, the vehicle body is subject to a roll moment due to the coupling of the lateral tire force and the lateral acceleration applied to the center of gravity of vehicle body. This roll moment causes suspension height variation, which in turn results in a vehicle relative roll angle (also called chassis roll angle or suspension roll angle). The relative roll angle is an important variable that is used as an input to the activation criteria and to construct the feedback brake pressure command, since it captures the relative roll between the vehicle body and the axle. The sum of such a chassis roll angle and the roll angle between wheel axle and the road surface (called wheel departure angle) provides the roll angle between the vehicle body and the average road surface, which is one of the important variables feeding back to the roll stability control module.

Figure 4:
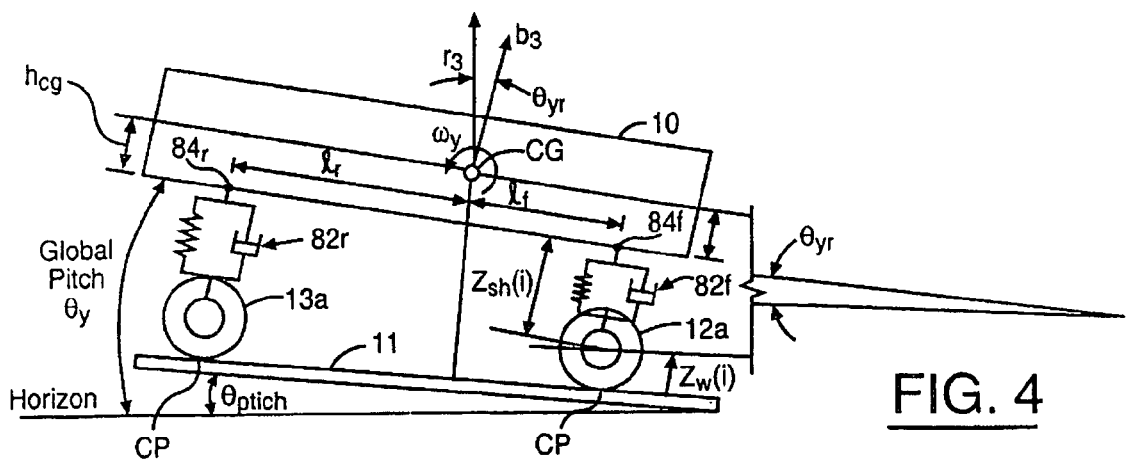
FIG. 4 is a side view of an automotive vehicle illustrating various variables thereon.

Referring now to FIG. 4, an automotive vehicle 10 is illustrated with various parameters illustrated thereon. The side view of automotive vehicle 10 is illustrated. A front suspension 82 and a rear suspension 82r is illustrated. The suspensions are coupled to the body at a respective suspension point 84f, 84r. The distance from the suspension point 84f to the center of the wheel is labeled $z_{sh}$. The distance from the center of gravity CG to the front suspension is labeled as $l_f$. The distance from the CG to the rear suspension point 84r is labeled as $l_r$. The vertical distance between the center of gravity and the suspension point are labeled respectively as $h_f$ and $h_r$. A portion of the body axis $b_3$ and the road axis $r_3$ are illustrated. The angle therebetween is the relative pitch angle $\theta_{yr}$. The rolling radius of the tire is labeled as $z_w$.

Figure 5:
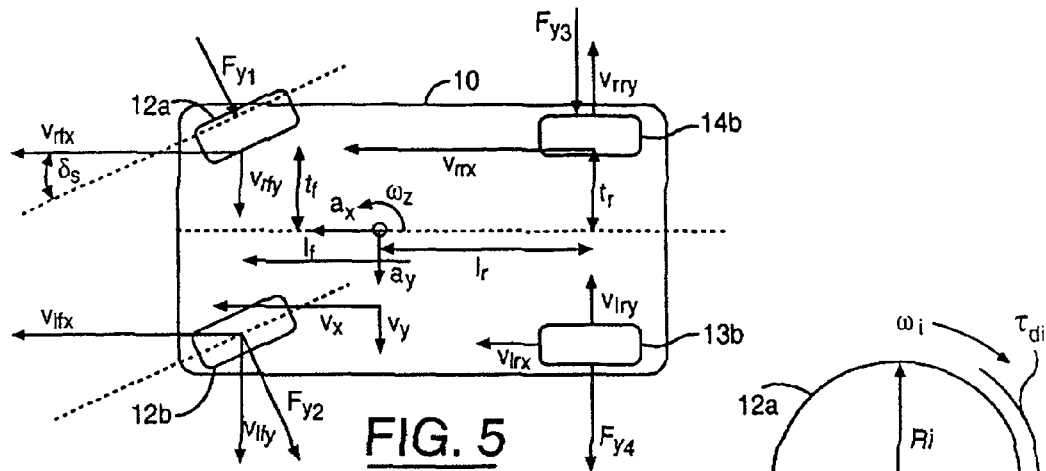
FIG. 5 is a top view of an automotive vehicle having the various forces acting thereon.

Referring now to FIG. 5, a top view of vehicle 10. Lateral and longitudinal velocities of the center of gravity are denoted as $v_x$ and $v_y$, a yaw angular rate is denoted as $\omega_z$, a front wheel steering angle is denoted as $\delta_s$, lateral acceleration is represented by $a_y$, and longitudinal acceleration is represented by $a_x$.

Also illustrated is the front track width $t_f$ and rear track width $t_r$. That is, the track widths are half the track widths from the center line or center of gravity of the vehicle to the center of the tire.

Figure 6:
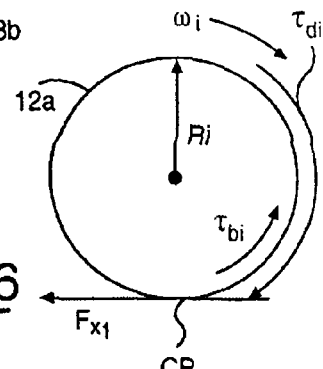
FIG. 6 is a side view of a wheel of an automotive vehicle having the wheel speed and torques acting thereon.

Referring now to FIG. 6, a wheel and tire assembly 12b is illustrated. The wheel speed is illustrated as $\omega_l$. The braking torque on the wheel is $\tau_{bi}$. The drive torque of the wheel is illustrated as $\tau_{di}$. It should be noted that the subscript i represents an integer of which there are four typically in a vehicle.

Figure 7:
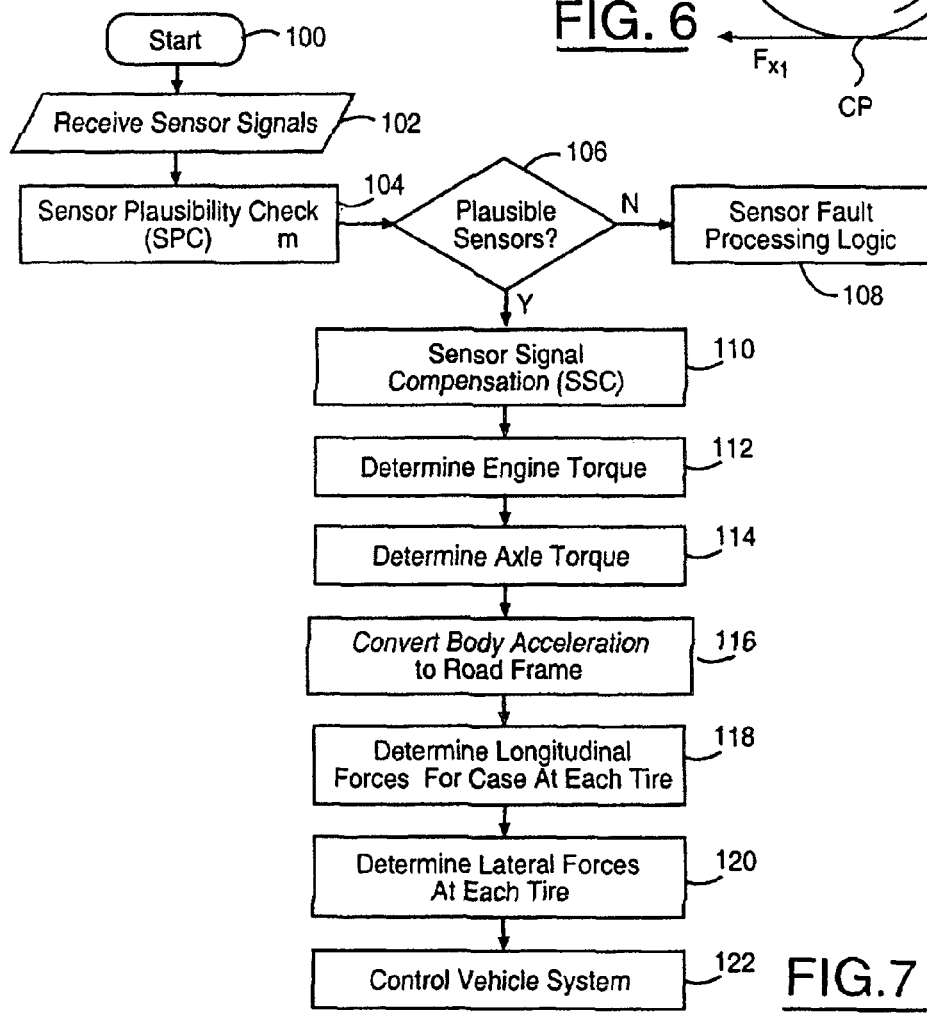
FIG. 7 is a logic flow diagram of a method for controlling a vehicle dynamic system in accordance with another embodiment of the present invention.

Referring now to FIG. 7, the method of the present invention begins in start block 110. In step 102, signals from the various sensors are received. In step 104, the plausibility of each of the sensors is determined. In step 106, if the sensor signals are not plausible, step 108 is executed in which sensor fault processing logic is performed. In step 110, sensor signal compensation is performed. Sensor signal compensation may include compensating the sensor signals for various offsets.

In the following all the deviations are based on a four-wheel vehicle model (in contrast to a single track bicycle model). The four-wheel vehicle is driven on an average road surface by averaging the four tire contact patches. A yaw road frame $r_1 r_2 r_3$ is used here to facilitate the computation. Such a yaw road frame has its longitudinal axle $r_1$ and lateral axle $r_2$ lie on the average road surface and its vertical axle $r_3$ perpendicular to the average road surface, and it yaws and moves with vehicle. The attitude difference between the vehicle body fixed frame and the yaw road frame is calculated as the relative attitude from the Relative Attitude Determination (RAD) unit in ISS.

The rotational motion of the ith wheel in a four-wheel vehicle model shown in FIG. 6 can be described by the following equation $$I_{wi}\dot{\omega}_i = \tau_{di} - \tau_{bi} - F_{xi}R_i \qquad (1)$$

where $F_{xi}$ is the longitudinal force applied to the ith wheel from the road, which is called the longitudinal road force; $R_i$ is the rolling radius of the ith wheel; $\tau_{di}$ is the driving torque applied to the wheel and $\tau_{bi}$ is the braking torque applied to the wheel; $\omega_i$ is the wheel rotational angular velocity measured through an ABS wheel speed sensor; $I_{wi}$ is the moment of inertia of the wheel tire assembly around the wheel rotational axis. i=1, 2, 3, 4 correspond to the front left, the front right, the rear left and the rear right wheel respectively.

Notice that, the braking torque for the ith wheel can be directly calculated from the wheel pressure $$\tau_{bi} = \tau_{si} p_i \quad (2)$$

where $p_i$ is the brake pressure and $\tau_{si}$ is the so-called specific torque for the ith brake, which depends on the following for disk brake systems:
- the brake efficiency;
- the friction coefficient between the brake lining and the disk;
- the radius from the center of the brake lining to the center of the wheel;
- the area of the brake piston; and
- the number of pistons per wheel brake.

The drive torque $\tau_{di}$ at the ith wheel is related to the engine torque $\tau_e$. In step 112 the engine torque is determined. The following description presumes a front wheel drive vehicle with an open differential. Of course, these equations may be easily modified for a rear drive condition. In this case the following is true $$\tau_{d1} = \tau_{d2} = \tau_{fa} \quad (3)$$
$$\omega_{fa} = \frac{w_1}{2R_1} + \frac{w_2}{2R_2}$$

where $\omega_a$ denotes the rotational speed of the drive axle. Through inertia relationships, the axle torque at the front axle may be determined from the engine torque in step 114. The engine torque may be determined from the torque mapping based on the engine speed and loading. Such mapping is typically done in engine development and is stored in a memory in the engine controller.

$I_e$ is the engine rotational inertia, $\omega_e$ the engine rotational speed, $\tau_{tci}$ the torque at the input of the torque converter, $$I_e \dot{\omega}_e = \tau_e - \tau_{tci} \quad (4)$$

The $\tau_{tco}$ torque output of the torque converter is related to the torque input $\tau_{tci}$ $$\tau_{tco} = \alpha \tau_{tci} \quad (5)$$

$\omega_t$ is the transmission rotation speed, $I_t$ the transmission inertia, $r_t$ the transmission ratio, then the output torque $\tau_t$ of the transmission satisfies $$I_t \dot{\omega}_t = \tau_{tco} - r_t \tau_t \quad (6)$$

$\omega_d$ is the rotational speed of the drive axle, $I_d$ the rotational inertia of the drive axle, $$I_d \dot{\omega}_d = \tau_t - r_{da} \tau_d \quad (7)$$

Based on the above equations, the axle torque $\tau_a$ can be computed as in the following $$\tau_{fa} = c_1(\tau_e - I_e \dot{\omega}) \lambda\left(\frac{c_2 \omega_{fa}}{\omega_e}\right) - c_3 I_t \dot{\omega}_{fa} - c_4 I_d \dot{\omega}_{fa} \quad (8)$$

where $c_1, c_2, c_3, c_4$ are 4 coefficients which are functions of the involved gear ratios, $\lambda(\bullet)$ is a nonlinear function.

Similar consideration may be conducted for a rear wheel drive, and four wheel drive vehicle. In the following discussion only the front wheel drive is considered.

Using the calculated axle torque for the front axle, the wheel motions for the four wheel rotational motions satisfying the following (subscript 1 and 2 are front wheels, 3 and 4 represent rear wheels):

$$I_{wf} \dot{\omega}_1 = \tau_{fa} - \tau_{b1} - F_{x1} R_1$$
$$I_{wf} \dot{\omega}_2 = \tau_{fa} - \tau_{b2} - F_{x2} R_2$$
$$I_{wr} \dot{\omega}_3 = -\tau_{b1} - F_{x3} R_3$$
$$I_{wr} \dot{\omega}_4 = -\tau_{b2} - F_{x4} R_4 \quad 9)$$

For the four-wheel vehicle model shown in FIG. 5, the IMU sensor cluster is mounted on the vehicle body, i.e., along the body-fixed xyz frame, while the tire forces are along the yaw or road frame. Hence the body-fixed accelerations are converted to the road frame in step 116 by the following $$a_{x\text{-}road} = a_{xs} \cos(\theta_{yr}) + a_{ys} \sin(\theta_{xr}) \sin(\theta_{yr}) + a_{zs} \sin(\theta_{xr}) \cos(\theta_{yr})$$

$$a_{y\text{-}road} = a_{ys} \cos(\theta_{xr}) \cos(\theta_{yr}) + a_{zs} \sin(\theta_{xr}) \quad (10)$$

where $a_{xs}$ is the longitudinal sensor output, $a_{ys}$ is the lateral sensor output, $\theta_{yr}$ is a calculated relative pitch angle, $\theta_{xr}$ is a calculated relative roll angle.

The yaw rate signal around the axis perpendicular to the average road surface may be computed as in the following $$\omega_{z\text{-}road} = -\omega_{xs} \sin(\theta_{yr}) + \omega_{ys} \sin(\theta_{xr}) \cos(\theta_{yr}) + \omega_{zs} \cos(\theta_{xr}) \cos(\theta_{yr}), \quad (11)$$

where $\omega_{zs}$ is the output of the yaw rate sensor, $\omega_{xs}$ is the output of the roll rate sensor, $\omega_{ys}$ is the output of the pitch rate sensor.

The longitudinal road forces are also the forces to move the whole vehicle. Hence based on the four-wheel vehicle model in FIGS. 4 and 5, the following equations describe the total vehicle's longitudinal motion along the yaw road axle $r_1$ $$M_t a_{x\text{-}road} = (F_{x1} + F_{x2}) \cos(\delta_s) + F_{x3} + F_{x4} - (F_{y1} F_{y2}) \sin(\delta_s) \quad (12)$$

where $M_t$ is the total vehicle mass; $a_{xs}$ is the vehicle longitudinal acceleration measured by a sensor; $\delta_s$ is the steered wheel angle, which can be calculated through the driver's steering wheel (hand wheel) angle and the known steering gear ratio; $\theta_y$ is the vehicle body's pitch angle; $F_{y1}$, $F_{y2}$, $F_{y3}$ and $F_{y4}$ are the lateral forces applied to the front-left, front-right, rear-left and rear right wheels (tires) from the road, $F_{x1}$, $F_{x2}$, $F_{x3}$ and $F_{x4}$ and the longitudinal forces applied to the wheels/tires.

The lateral motion of the four-wheel vehicle model should obey the following equation of motion along the yaw road axle $r_2$ and $r_3$ $$I_z \dot{\omega}_{z\text{-}road} = M_{long} + M_{lat}$$

$$M_t a_{y\text{-}road} = (F_{x1} + F_{x2}) \sin(\delta_s) + (F_{y1} + F_{y2}) \cos(\delta_s) + F_{y3} F_{y4} \quad (13)$$

where $M_{long}$ and $M_{lat}$ are the yawing moments generated from the longitudinal forces and lateral forces respectively and they are along the yaw road axle $r_3$ $$M_{long} = F_{x1} l \cos(\gamma + \delta_s) - F_{x2} l \cos(\gamma - \delta_s) + (F_{x3} - F_{x4}) t_r$$

$$M_{lat} = F_{y1} l \sin(\gamma + \delta_s) + F_{y2} l \sin(\gamma - \delta_s) - (F_{y3} + F_{y4}) l_r \quad (14)$$

where $$l = \sqrt{t_f^2 + l_f^2}, \gamma = a\tan(t_f / l_f). \quad (15)$$

Notice that for a front wheel steering vehicle, the rear wheel is kept in the same direction during travel. Therefore, the resultant effect of the lateral force on the two wheels of the rear axle $F_{y3}$ and $F_{y4}$ are the same as the effect of the their sum. At the same token, for the rear wheel steering case, the resultant effect of the lateral force on the two wheels of the rear axle $F_{y1}$ and $F_{y2}$ are the same as the effect of the their sum. Hence in front wheel steering case the two unknowns $F_{y3}$ and $F_{y4}$ are combined as one unknown variable $$F_{yr} = F_{y3} + F_{y4} \qquad (16)$$

and in the rear wheel steering case, the two unknowns $F_{y1}$, and $F_{y2}$ are combined as one unknown variable $$F_{yf} = F_{y1} + F_{y2} \qquad (17)$$

Therefore in the front wheel steering case, the following seven wheel forces are determined from seven equations: $F_{x1}, F_{x2}, F_{x3}, F_{x4}, F_{y1}, F_{y2}$ and $F_{yr}$; and in rear wheel driving case the following seven wheel forces are needed to be determined from seven equations: $F_{x1}, F_{x2}, F_{x3}, F_{x4}, F_{yf}, F_{y3}$ and $F_{y4}$. In the following discussion, the front wheel steering case is set forth. The rear wheel steering case may be similarly obtained.

Define a longitudinal force vector as $$F_x = \begin{bmatrix} F_{x1} \\ F_{x2} \\ F_{x3} \\ F_{x4} \end{bmatrix} \qquad (18)$$

and a lateral force vector $$F_y = \begin{bmatrix} F_{y1} \\ F_{y2} \\ F_{yr} \end{bmatrix} \qquad (19)$$

From Equation (9), the longitudinal forces for each wheel $F_x$ may be determined in step 118 as in the following $$F_x = \begin{bmatrix} \frac{1}{R_1}\left(\tau_{af} - \tau_{b1} - I_{wf}\frac{\dot{w}_1}{R_1}\right) \\ \frac{1}{R_2}\left(\tau_{af} - \tau_{b2} - I_{wf}\frac{\dot{w}_2}{R_2}\right) \\ \frac{1}{R_3}\left(-\tau_{b3} - I_{wr}\frac{\dot{w}_3}{R_3}\right) \\ \frac{1}{R_4}\left(-\tau_{b4} - I_{wr}\frac{\dot{w}_4}{R_4}\right) \end{bmatrix} \qquad (20)$$

From Equations (12) and (13), the matrix form of the following computation of $F_y$ from $F_x$ is determined $$F_x = C^{-1}(\delta_s)\left(M\begin{bmatrix} a_{x-road} \\ \dot{\omega}_{z-road} \\ a_{y-road} \end{bmatrix} + D(\delta_s)F_x\right) \qquad (21)$$

where the matrices $C(\delta_s), M$ and $D(\delta_s)$ are defined as in the following $$C(\delta) = \begin{bmatrix} \sin(\delta_s) & \sin(\delta_s) & 0 \\ l\sin(\delta_s+\gamma) & -l\sin(\delta_s-\gamma) & -l_r \\ \cos(\delta_s) & \cos(\delta_s) & 1 \end{bmatrix} \qquad (22)$$

$$M = \begin{bmatrix} -M_t & 0 & 0 \\ 0 & I_z & 0 \\ 0 & 0 & M_t \end{bmatrix}$$

$$D(\delta) = \begin{bmatrix} \cos(\delta_s) & \cos(\delta_s) & 1 & 1 \\ -l\cos(\delta_s+\gamma) & l\cos(\delta_s-\gamma) & -t_r & t_r \\ -\sin(\delta_s) & -\sin(\delta_s) & 0 & 0 \end{bmatrix}$$

For the magnitude of the steering angle $|\delta_s| \geq \underline{\delta}$ with a small non-zero value threshold $\underline{\delta}$, (21) may be determined in step 120 and may be further expressed as in the following $$F_{yr} = M_t\left(a_{y-road} + \frac{a_{x-road}}{\tan(\delta_s)}\right) - \frac{F_{x1}+F_{x2}}{\sin(\delta_2)} - \frac{F_{x3}+F_{x4}}{\tan(\delta_s)} \qquad (23)$$

$$F_{y1} = -\frac{l_r F_{yr}}{l_f \sin(\delta_s)} + \frac{-M_t a_{x-road} l\sin(\gamma-\delta_s) - I_z \dot{\omega}_{z-road}\sin(\delta_s)}{l}$$

$$F_{y2} = \frac{l_r F_{yr}}{l_f \sin(\delta_s)} + \frac{M_t a_{x-road} l\sin(\gamma+\delta_s) + I_z \dot{\omega}_{z-road}\sin(\delta_s)}{l}$$

When the steering angle $|\delta_s| < \underline{\delta}$ threshold, the above computation may no longer be valid. In this case, since $F_{y1}$ and $F_{y2}$ are along the same direction, their effects to the vehicle dynamics may not be distinguishable. In this case only the sum of $F_{y1}$ and $F_{y2}$, and the sum of $F_{y3}$ and $F_{y4}$ may be computed from the following relationship $$I_z \dot{\omega}_{z-road} = M_{long} + M_{lat}$$

$$M_t a_{y-road} = (F_{y1}+F_{y2}) + (F_{y3}+F_{y4})$$

$$M_{long} = F_{x1} l\cos(\gamma) - F_{x2} l\cos(\gamma) + (F_{x3}-F_{x4})t_r$$

$$M_{lat} = (F_{y1}+F_{y2})l\sin(\gamma) - (F_{y3}+F_{y4})l_r \qquad (24)$$

That is, the following computation may be used $$F_{y1}+F_{y2} = \frac{\begin{bmatrix} I_z\dot{\omega}_{z-road} - F_{x1}l\cos(\gamma) - \\ F_{x2}l\cos(\gamma) + (F_{x3}-F_{x4})t_r \end{bmatrix} + M_t a_{y-road}l_r}{l_r + l\sin(\gamma)} \qquad (25)$$

$$F_{y3}+F_{y4} = \frac{-\begin{bmatrix} I_z\dot{\omega}_{z-road} - F_{x1}l\cos(\gamma) - \\ F_{x2}l\cos(\gamma) + (F_{x3}-F_{x4})t_r \end{bmatrix} + M_t a_{y-road}l\sin(\gamma)}{l_r + l\sin(\gamma)}$$

In step 122, various systems of the vehicle may be controlled in response to the axle torque, the longitudinal forces and the lateral forces. Such systems may include traction control systems, yaw control systems, rollover control systems, suspension systems, engine systems, various vehicle safety systems including deployable safety systems such as airbags and rollover bars. Various portions of the vehicle suspension may also be controlled such as an anti-roll bar.

While particular embodiments of the invention have been shown and described, numerous variations and alternate embodiments will occur to those skilled in the art. Accordingly, it is intended that the invention be limited only in terms of the appended claims.

What is claimed is:

1. A method of controlling a vehicle having tires comprising:
    determining an axle torque;
    determining longitudinal forces at each tire in response to the axle torque;
    determining a steering wheel angle;
    determining a vehicle velocity;
    determining a plurality of lateral forces;
    when the steering wheel angle is at or exceeds a predetermined steering wheel angle threshold value, said determining of said plurality of lateral forces comprises determining lateral forces for each individual front tire and a lateral tire force for a rear tire in response to the longitudinal forces and the steering wheel angle;
    when the steering wheel angle is below the predetermined steering wheel angle threshold value, said determining of said plurality of lateral forces comprises determining a sum of lateral forces for the front tires and a sum of lateral forces for the rear tires in response to the longitudinal forces and the steering wheel angle; and
    controlling lateral motion of a vehicle system in response to the plurality of lateral forces.

2. A method as recited in claim 1 wherein determining said plurality of lateral forces comprises determining said plurality of lateral forces in response to the longitudinal forces and sensor signals used in a vehicle stability control system.

3. A method as recited in claim 1 wherein determining said plurality of lateral forces comprises determining said plurality of lateral forces in response to the longitudinal forces and a road frame longitudinal acceleration.

4. A method as recited in claim 3 further comprising determining the road frame longitudinal acceleration in response to a sensor lateral acceleration, a sensor vertical acceleration, a sensor longitudinal acceleration, a relative pitch angle and a relative roll angle.

5. A method as recited in claim 1 wherein determining said plurality of lateral forces comprises determining said plurality of lateral forces in response to the longitudinal force, a road frame longitudinal acceleration, a road frame lateral acceleration, a road frame yaw rate, a steered wheel angle.

6. A method as recited in claim 5 further comprising determining the road frame yaw rate in response to a sensor roll rate, a sensor yaw rate, a sensor pitch rate, a relative pitch angle and a relative roll angle.

7. A method as recited in claim 5 further comprising determining the road frame lateral acceleration in response to a sensor lateral acceleration, a sensor vertical acceleration, a relative pitch angle, and a relative roll angle.

8. A method of controlling a vehicle as recited in claim 1 wherein the step of controlling lateral motion of a vehicle is related to a vehicle safety system.

9. A method of controlling a vehicle as recited in claim 1 wherein the step of controlling lateral motion of a vehicle is related to a vehicle suspension.

10. A method of controlling a vehicle as recited in claim 1 wherein the step of controlling lateral motion of a vehicle is related to a dynamic control system.

11. A method of controlling a vehicle as recited in claim 10 wherein the dynamic control system comprises a roll stability control system.

12. A method of controlling a vehicle having a rear axle, said method comprising:
    determining a road frame longitudinal acceleration;
    determining a road frame lateral acceleration of the vehicle;
    determining road frame yaw rate;
    determining an axle torque in response to wheel speeds at the drive axle and an engine speed;
    determining a steered wheel angle;
    determining tire longitudinal forces in response to axle torque;
    determining a plurality of tire lateral forces;
    when the steered wheel angle is at or exceeds a predetermined steered wheel angle threshold value, said determining of said plurality of tire lateral forces comprises determining front individual tire lateral forces and a sum of tire lateral forces at the rear axle in response to the tire longitudinal forces, the road frame longitudinal acceleration, the road frame lateral acceleration and the steered wheel angle;
    when the steered wheel angle is below the predetermined steered wheel angle threshold value, said determining of said plurality of tire lateral forces comprises determining a sum of tire lateral forces at the front axle and a sum of tire lateral forces at the rear axle in response to the tire longitudinal forces, the road frame longitudinal acceleration and the road frame lateral acceleration; and
    controlling lateral motion of a vehicle system in response to the tire plurality of tire lateral forces.

13. A method as recited in claim 12 further comprising determining the road frame longitudinal acceleration in response to a sensor lateral acceleration, a sensor vertical acceleration, a sensor longitudinal acceleration, a relative pitch angle and a relative roll angle.

14. A method as recited in claim 12 further comprising determining the road frame yaw rate in response to a sensor roll rate, a sensor yaw rate, a sensor pitch rate, a relative pitch angle and a relative roll angle.

15. A method as recited in claim 12 further comprising determining the road frame lateral acceleration in response to a sensor lateral acceleration, a sensor vertical acceleration, a relative pitch angle and a relative roll angle.

16. A method of controlling a vehicle as recited in claim 12 wherein controlling lateral motion of a vehicle comprises controlling at least one of a vehicle safety system, a vehicle suspension, a dynamic control system, a roll stability control system, a yaw stability control system and a vehicle suspension.

* * * * *